United States Patent [19]

Hergoualc'h et al.

[11] 4,039,291
[45] Aug. 2, 1977

[54] INTERNAL COMBUSTION ENGINE CATALYTIC ANTI-POLLUTION REACTOR

[75] Inventors: Jean René Hergoualc'h; Michel Fornet, Boulogne-Billancourt, both of France

[73] Assignees: Regie Nationale des Usines Renault, Boulogne-Billancourt; Automobiles Peugeot, Paris, both of France

[21] Appl. No.: 561,904

[22] Filed: Mar. 25, 1975

[30] Foreign Application Priority Data

Mar. 27, 1974 France .............................. 74.10454

[51] Int. Cl.² .......................... B01J 8/02; B01J 35/04; F01N 3/15
[52] U.S. Cl. .......................... 23/288 FC; 55/DIG. 30
[58] Field of Search ........ 23/288 F, 288 FB, 288 FC; 285/227; 55/DIG. 30

[56] References Cited

U.S. PATENT DOCUMENTS

| 2,216,763 | 10/1940 | Boyce | 23/288 F UX |
|---|---|---|---|
| 2,834,425 | 5/1958 | Rawson | 55/DIG. 30 |
| 2,938,593 | 5/1960 | Miller et al. | 23/288 FC UX |
| 3,065,595 | 11/1962 | Gary | 23/288 FC |
| 3,166,895 | 1/1965 | Slayter et al. | 23/288 FC X |
| 3,231,520 | 1/1966 | Leak et al. | 23/288 FC UX |
| 3,369,829 | 2/1968 | Hopkins | 285/227 |
| 3,692,497 | 9/1972 | Keith et al. | 23/288 FC |
| 3,702,236 | 11/1972 | Fessler | 23/288 F |
| 3,798,006 | 3/1974 | Ballaff | 23/288 FL |
| 3,811,845 | 5/1974 | Nakamura | 23/288 FC |
| 3,854,888 | 12/1974 | Frietzsche | 23/288 FC |
| 3,867,105 | 2/1975 | Wagner | 23/288 F |
| 3,891,396 | 6/1975 | Masall et al. | 23/288 FC |

Primary Examiner—Morris O. Wolk
Assistant Examiner—Michael S. Marcus
Attorney, Agent, or Firm—Fleit & Jacobson

[57] ABSTRACT

A catalytic reactor for the anti-pollution exhaust of internal combustion engines comprising a central case containing the catalytic elements and a pair of end shaped necks for connecting the assembly to the exhaust piping system.

The shaped necks comprise at least one rounded marginal portion of which the outer edge is connected tangentially, in edge to edge relationship, to the corresponding marginal portion of the central case possibly extended beyond said catalytic elements.

5 Claims, 3 Drawing Figures

U.S. Patent Aug. 2, 1977 4,039,291
Fig. 1
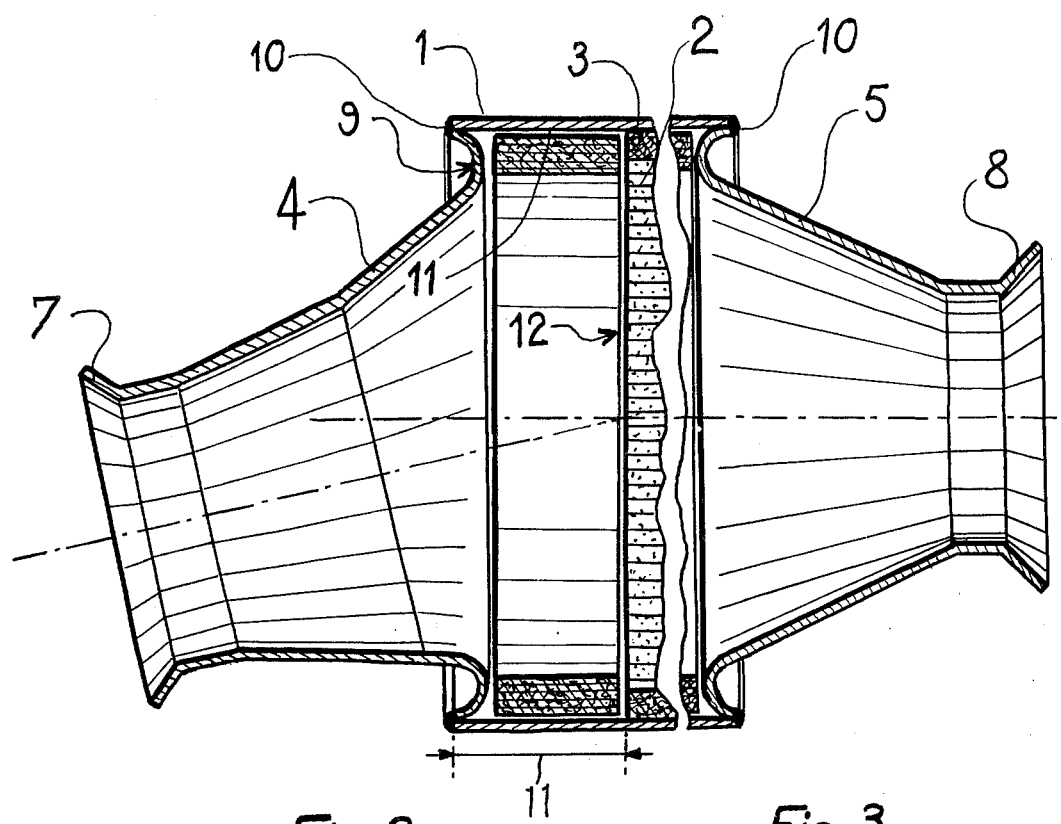
Fig. 2
Fig. 3
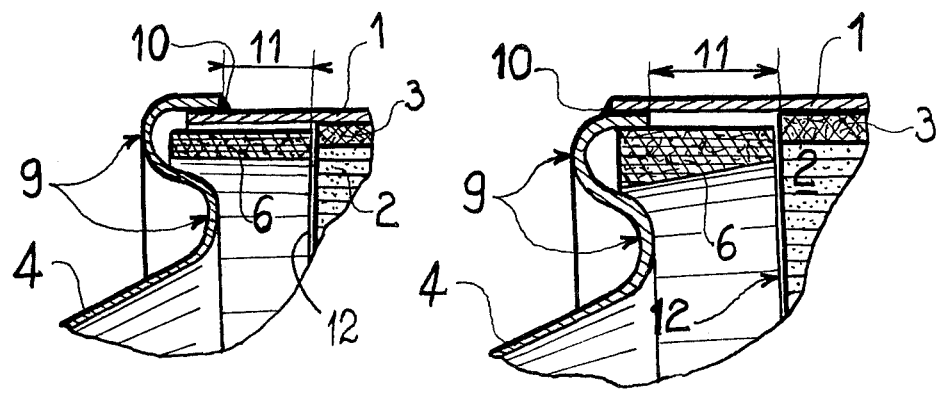

INTERNAL COMBUSTION ENGINE CATALYTIC ANTI-POLLUTION REACTOR

The present invention relates to improvements in the construction of catalytic reactors for the anti-pollution treatment of exhaust gases of internal combustion engines.

As a rule, these reactors comprise a metal case containing one or a plurality of catalytic reaction beds through which the exhaust gases are caused to pass.

These beds comprise the catalytic substance deposited on the surface of a support in order to provide a porous assembly of relatively considerable surface area, that is, a porous support for interfering as little as possible with the flow of exhaust gases and a great surface in order to produce a catalytic reaction as complete as possible throughout the gaseous flow.

These catalytic beds consist either of a great number of ceramic or metallic particles of flat or spherical configuration, or of compact blocks also of ceramic or metallic material, impregnated with the catalytic product.

One of the major reasons for the relatively short useful life of these structures is the action of engine vibration transmitted directly through the exhaust pipe and determining a mechanical fatigue in the catalytic beds which, in conjunction with frequent thermal shocks during their operation, leads to a premature disintegration of the active catalyst layer. This erosion, particularly rapid in beds consisting of particulate material, is also considerable in reactors comprising a ceramic supporting block wherein walls of relatively reduced thickness are ill suited for withstanding the vibratory rates applied thereto. In order to limit the detrimental effects thereof, it is known to dispose between the ceramic block and the metal case a fibrous material, generally glass wool, for absorbing both vibration and thermal expansion effects. However, this ceramic block protecting fibrous material is gradually rammed and eventually looses its damping property, so that its action becomes inadequate for the purpose.

It is the essential object of the present invention to provide in a simple and economical manner a lasting damping action against vibration in all types of catalytic reactors of the type broadly set forth hereinabove. To this end, in a catalytic reactor comprising a central metal case containing the catalytic elements and on either side two shaped necks for connecting same to the exhaust piping system, said case is characterised in that said shaped necks comprise at least one rounded edge-forming or marginal portion connected tangentially in edge to edge relationship to the corresponding ends of the central, substantially cylindrical portion of the case.

Possibly, the damping capacity or effect is increased by leaving a certain distance between on the one hand the area where the edge of the rounded portion of each shaped neck is connected to the edge of the central case or body and, on the other hand the central portion of the case or body which receives the catalytic elements, constituting a relatively rigid structure. This connecting area, consisting of a single strip of relatively thin sheet metal between the stiffer area where it is connected both to the shaped neck and to the central body containing the catalytic block, provides a second resilient area for damping out vibration complementing that constituted by said rounded edge-forming portion of the shaped neck connected tangentially to said central body. Therefore, with this arrangement two successive vibration damping areas consisting of sheet metal portions subjected to alternating flexion stresses and separated by the stiffer connecting portions thereof are provided between the exhaust piping transmitting the engine vibration and the catalytic block to be protected.

In the most popular catalytic reactor configuration having a generally circular cross-section with a substantially frustoconical connecting shaped neck, the central case having a cylindrical configuration, this particular arrangement provides a vibration damping action having the same efficiency in all directions.

By construction, an efficient and lasting vibration damping action is produced in the catalytic block, this result being obtained through simple means at a very low cost. The provision of rounded connecting areas facilitates the assembling of frustoconical shaped necks having their axes not aligned with that of the catalytic reactor proper, thus permitting of dispensing with elbows or like fittings for connecting the device with the exhaust piping, so that a simplified and shorter structure is obtained.

A typpical form of embodiment of a catalytic reactor according to this invention will now be described by way of example with reference to the attached drawing, in which:

FIG. 1 is a part-sectional, part-elevational view of a catalytic reactor according to this invention, of a current cylindrical type, and FIGS. 2 and 3 are detail sectional views showing modified forms of embodiment of the rounded connecting portions of the shaped necks of the device.

Referring first to FIG. 1 of the drawing, a cylindrical central sleeve 1 containing one or a plurality of catalytic elements 2 enclosed in a manner known per se in a fibrous vibration-damping material 3 is connected according to this invention on the one hand to a substantially frustoconical shaped neck 4 having its axis inclined in relation to that of said sleeve 1, and on the other hand to another frustoconical shaped neck 5 coaxial with said sleeve 1. Distance-pieces 6 preferably in the form of rings consisting of rammed damping fibrous material may be disposed with a suitable assembling clearance on either side of the catalytic elements 2 in order properly to centre same in the sleeve 1.

The shaped necks 4 and 5 comprise at their small ends or minor bases circular outflaring flanges 7 and 8 for connecting same to the exhaust piping system.

the major bases of said necks 4 and 5 have an extension in the form of a rounded marginal portion 9 and the edge of each marginal portion 9 is connected or assembled tangentially, in edge to edge relationship, to the corresponding edge of sleeve 1 so that a weld seam 10 can be applied to both during the assembling step, which is particularly accessible and can be formed without difficulty.

In this simple form of embodiment the vibration damping action is obtained by flexing not only the rounded marginal portions 9 of shaped necks 4 and 5 but also of the sections 11 of the central sleeve 1 disposed between the outer surfaces 12 of the catalytic elements 2 and the weld seams 10.

By disposing the weld seams 10 in the manner illustrated, i.e. outwards, it is possible to reserve a maximum length for the damping area 11 with the reduced overall dimension while disposing within the sleeve 1 the rounded marginal portions 9 of said shaped necks 4 and 5, so as to improve the compactness of the device without impairing its damping efficiency.

FIGS. 2 and 3 of the drawing illustrate modified dispositions wherein the rounded marginal portion 9 of the shaped neck 4 (and 5 for obvious reasons of symmetry) is of substantially S configuration, the edge thereof fitting either internally or externally in or outside the edge of the central case, thus increasing the damping action of the device. These dispositions also entail a reduction in the length of the connecting shaped necks.

Of course, the relative dimensions, such as radii of curvature, thickness of the sheet metal stock, etc..., are a matter of proper choice depending more particularly on the vibration to be damped and also on the weights or masses to be damped, said dimensions being determined by calculation, or experimentally in any known and conventional manner.

What is claimed as new is:

1. An anti-pollution catalytic reactor for the exhaust gases of internal combustion engines comprising, in combination, a metal sleeve of circular cross-sectional shape having an axis, oppositely disposed annular end edges and an interior, a catalytic element having ends disposed within said sleeve interior with said ends in axially spaced relationship with the respective annular end edge of said sleeve, a pair of frustoconically shaped neck members each having a circumferentially extending rounded marginal portion on one end terminating in an annular end edge, said rounded marginal portion extending within the sleeve interior and spaced from said sleeve and having the other end arranged to be connected to an associated exhaust piping system, the annular end edge of each of said neck members being secured in tangential edge-to-edge relationship to one of the annular end edges of said metal sleeve in axially spaced relationship with the adjacent end of said catalytic element, an annular resilient means for dampening vibrations comprising an annulus formed by a connecting portion of said sleeve extending between the annular end edge of said neck member and the end of said catalytic element whereby the annular end edge of said metal sleeve secured to the annular end edge of said neck members in tangential edge-to-edge relationship provides a stiffer portion than said sleeve connecting portion, and the sleeve portion surrounding the catalytic element provides a stiffer portion than said sleeve connecting portion, whereby said rounded marginal portions and said annular resilient means dampen vibrations imposed on said reactor.

2. A catalytic reactor in accordance with claim 1 wherein each of said rounded marginal portions includes an outwardly directed concavity, the annular end edges of said rounded marginal portions being connected internally and tangentially to said sleeve annular edges by means of a welded seam.

3. A catalytic reactor in accordance with claim 1 wherein said rounded marginal portions are of substantially S-shaped, cross-sectional configuration, said end edges of said rounded marginal portions being fitted within the corresponding end edge of said sleeve.

4. A catalytic reactor in accordance with claim 1 wherein at least one of said neck members has its axis disposed in diverging relationship with the axis of said sleeve.

5. A catalytic reactor in accordance with claim 1 whereby said sleeve connecting portion is formed from a single strip of relatively thin sheet metal.

* * * * *